United States Patent
Weaver

[11] Patent Number: 6,036,417
[45] Date of Patent: Mar. 14, 2000

[54] STABILIZING ARM FOR ALL-TERRAIN VEHICLE

[76] Inventor: Danny C. Weaver, 6652 St. Vincent Ave., Shreveport, La. 71106

[21] Appl. No.: 08/993,661

[22] Filed: Dec. 18, 1997

[51] Int. Cl.[7] ........................................................ B60P 7/08
[52] U.S. Cl. ............................ 410/7; 410/2; 410/3; 410/4
[58] Field of Search .................................. 410/3, 4, 2, 7, 410/8, 9, 19, 22, 77, 80; 248/500, 503, 507; 296/26.08, 26.09; 280/511, 512; 224/403, 510, 511, 519, 520, 521; 414/462

[56] References Cited

U.S. PATENT DOCUMENTS

| | | | |
|---|---|---|---|
| 3,730,552 | 5/1973 | Clark | 410/3 |
| 4,561,575 | 12/1985 | Jones | 414/462 X |
| 4,563,018 | 1/1986 | Stage et al. | 280/402 |
| 4,635,835 | 1/1987 | Cole | 414/462 X |
| 4,738,531 | 4/1988 | Kuhlman | 414/462 |
| 5,211,526 | 5/1993 | Robinette | 414/462 X |
| 5,232,135 | 8/1993 | Marren | 224/509 |
| 5,599,002 | 2/1997 | Knutson | 248/503 X |
| 5,678,743 | 10/1997 | Johnson et al. | 224/521 X |
| 5,690,260 | 11/1997 | Aikins et al. | 224/521 X |
| 5,749,685 | 5/1998 | Hair | 410/7 |
| 5,752,799 | 5/1998 | Carey et al. | 414/462 X |
| 5,833,412 | 11/1998 | Valencia et al. | 410/2 |

FOREIGN PATENT DOCUMENTS 2062999A  9/1992  Canada ................................ 224/521

OTHER PUBLICATIONS

Dec., 1997, publication of "Dirt Wheels", p. 40, advertisement, "ATV Trailer Vise", Outdoor Innovations, Inc., 1 page.

*Primary Examiner*—Stephen T. Gordon
*Attorney, Agent, or Firm*—John M. Harrison

[57] ABSTRACT

A stabilizing arm for stabilizing and securing an all-terrain vehicle in the bed of a pickup truck, which stabilizing arm includes in a preferred adjustable embodiment, a support typically selectively pivotally or rotatably and slidably disposed in a support sleeve mounted on a drawbar typically fitted to a conventional truck trailer hitch. A support arm projects from the top end of the support and terminates in a fixed or pivotable ball coupler designed to couple to an ATV ball attached to the all-terrain vehicle. In a preferred embodiment a clamp is threaded in the typically box tubing support sleeve and selectively engages the box tubing support for securing the support in non-sliding relationship with respect to the support sleeve. A cylindrical support leg is secured to the bottom end of the support to facilitate uncoupling the ball coupler from the ATV ball, lifting the support in the support sleeve upon loosening the clamp, aligning the cylindrical support leg with the support sleeve and pivoting or rotating and lowering the support and support arm into a position below the plane of the truck bed and allow loading and unloading the all-terrain vehicle. In a non-adjustable embodiment, the stabilizing arm includes a support, support arm and drawbar that are fixed with respect to each other.

20 Claims, 3 Drawing Sheets

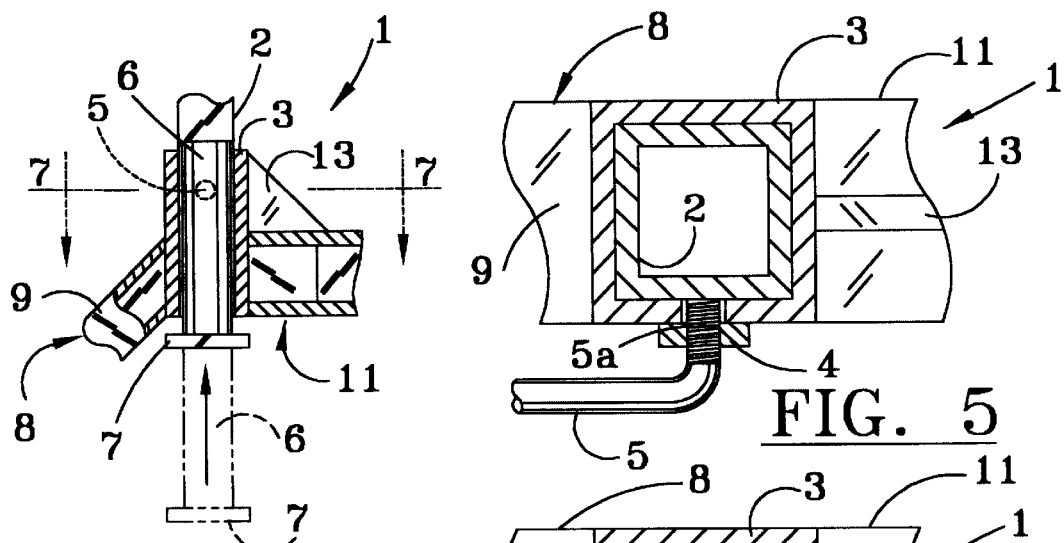
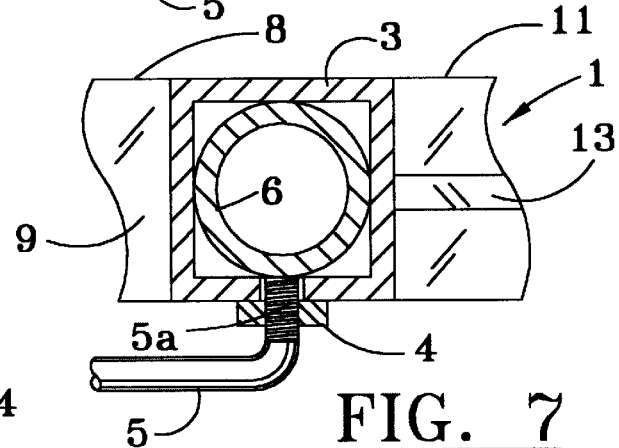
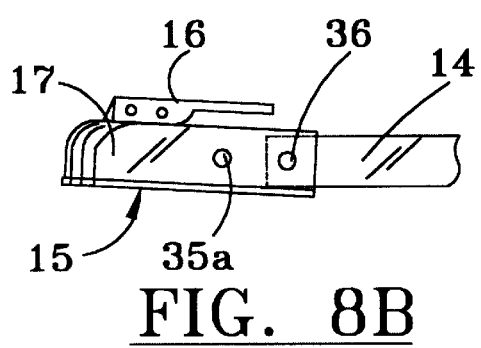
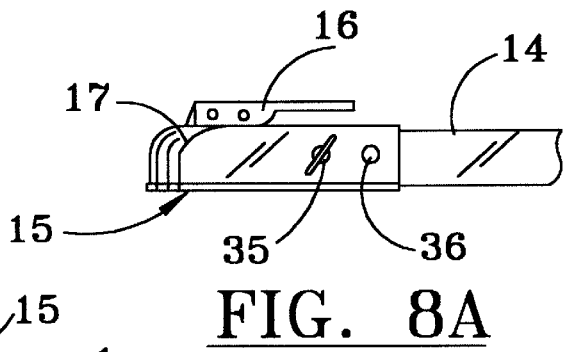
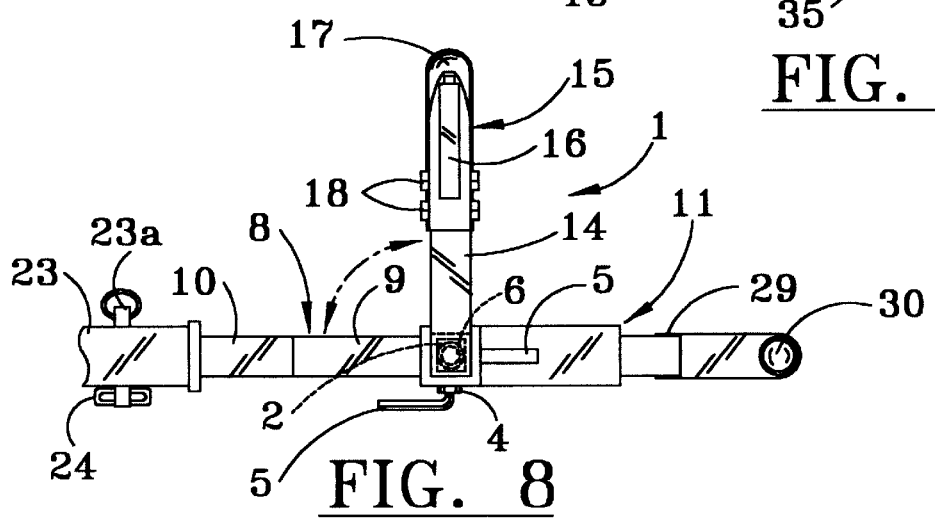

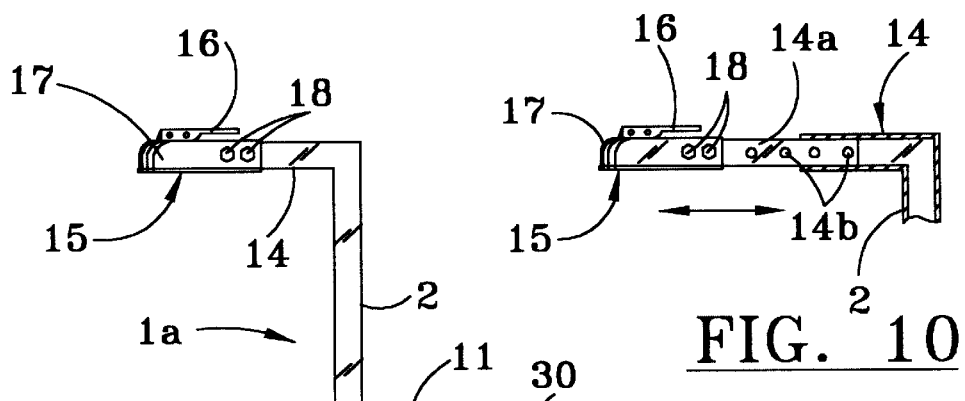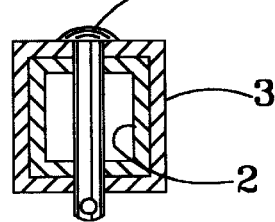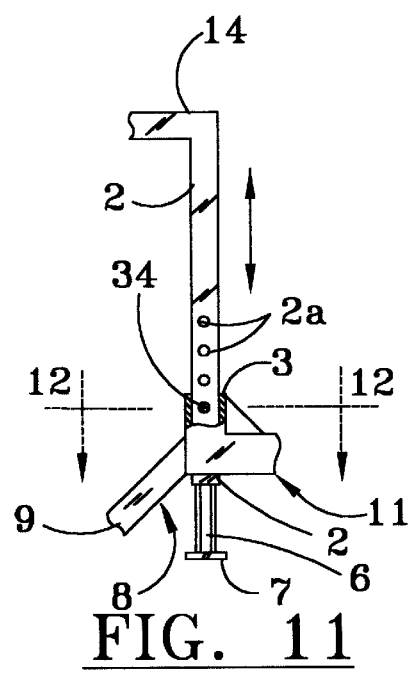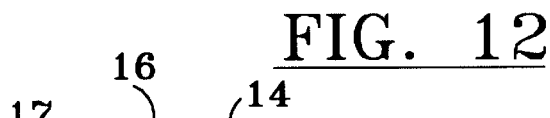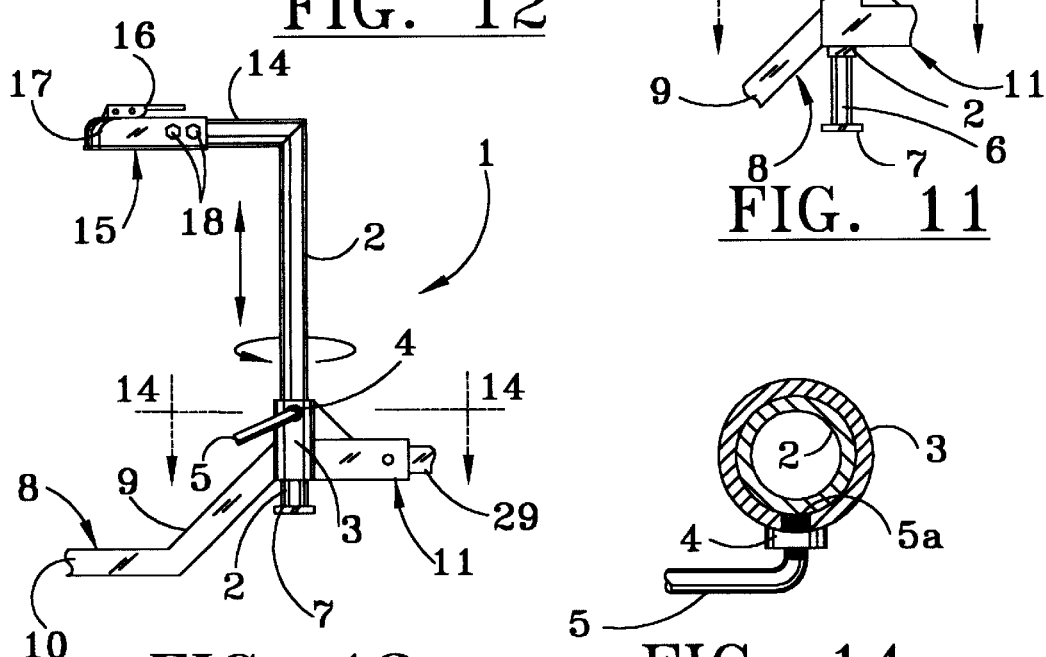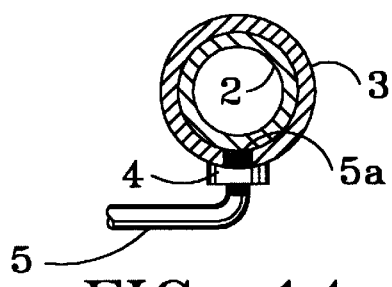

STABILIZING ARM FOR ALL-TERRAIN VEHICLE

BACKGROUND OF THE INVENTION

1. Field of the Invention

This invention relates to the transportation of wheeled vehicles in the bed of a truck such as a pickup truck and more particularly, to a stabilizing arm for securing and stabilizing an all-terrain vehicle in the bed of a pickup truck. The stabilizing arm may be fixed or adjustable and is preferably constructed of box tubing, as hereinafter described.

One of the problems which is involved in securing a wheeled vehicle, including an all-terrain vehicle (ATV) in the bed of trucks, and typically pickup trucks, is that of devising a strap, chain or harness system for securely anchoring the wheeled vehicle to the bed and/or sides of the pickup truck without slipping or loosening of the restraints during travel. Conventional straps with buckles are typically used to achieve this end, but are prone to loosen due to the vibration, stress and strain of tension applied when the wheeled vehicle lurches in the truck bed responsive to braking and accleration of the truck. Since the wheeled vehicle, typically an all-terrain vehicle, may be longer than the bed of a pickup truck between the tailgate and the cab, the tailgate must usually be lowered during transit. Accordingly, if the straps, cords, ropes or other restaints which secure the wheeled vehicle in the bed of the pickup truck loosen sufficiently, the wheeled vehicle may actually fall from the bed and tailgate of the pickup truck or damage the cab of the truck during braking and acceleration.

2. Description of the Prior Art

Typical restraints for maintaining wheeled vehicles such as lawnmowers, all-terrain vehicles and the like in the beds of trucks such as pickup trucks, include chains, bungee cords, ropes and straps having buckles of various description, which restraints are normally attached to cleats or tie-down openings or rails provided in the pickup truck bed and/or sides and secured to the wheeled vehicle. Other restraint systems are more elaborate and include chains that wrap around the wheels of the vehicle which are closest to the tailgate, which chains connect to a bar and cleat system for maintaining the wheeled vehicle in the bed of the pickup truck during transportation.

It is an object of this invention to provide a new and improved stabilizing arm for mounting on a truck and stabilizing and securing a wheeled vehicle in the bed of the truck.

Another object of the invention is to provide a one-piece stabilizing arm for securing a wheeled vehicle such as an all-terrain vehicle in the bed of a truck such as a pickup truck, both during transportation and while the truck is at rest, which stabilizing arm is designed to couple to an ATV ball mounted on the all-terrain vehicle and to the conventional trailer hitch of the truck to secure the all-terrain vehicle in the bed of the truck.

Still another object of this invention is to provide an adjustable stabilizing arm for securing a wheeled vehicle such as an ATV in the bed of a truck such as a pickup truck, the stabilizing arm having a drawbar for insertion in the drawbar receptacle of the conventional trailer hitch of the pickup truck, a support that selectively slides and pivots or rotates in a sleeve mounted on the drawbar and a support arm extending from the support and fitted with a fixed or pivotable coupler for removably attaching to the ATV ball of the all-terrain vehicle and securing the all-terrain vehicle in the bed of the pickup truck.

Another object of this invention is to provide an adjustable stabilizing arm for securing and maintaining an all-terrain vehicle having an ATV ball in the bed of a pickup truck, both during transportation and while the truck is at rest. The stabilizing arm is characterized by a typically box tubing drawbar designed for insertion and optional locking in the trailer hitch receptacle of a conventional trailer hitch mounted on the pickup truck, a typically box tubing support sleeve fixed to the drawbar and slidably receiving a typically box tubing support, one end of which support mounts a support arm having a fixed or pivotable coupler for attachment to the ATV ball of the all-terrain vehicle located in the pickup truck bed and the other end of the support provided with a cylindrical support leg. The device facilitates selective securing of the ATV in the bed of the pickup truck and uncoupling of the coupler from the ATV ball and pivoting or rotating the hitch arm in the support sleeve at the cylindrical support leg and loading and unloading of the all-terrain vehicle into and from the bed of the pickup truck, respectively.

A still further object of this invention is to provide a stabilizing arm for stabilizing and securing an all-terrain vehicle fitted with an ATV ball, in the bed of a pickup truck for transportation, which stabilizing arm is designed to removably mount on the conventional trailer hitch of the pickup truck and couple to the ATV ball of the all-terrain vehicle located in the bed of the pickup truck. In an adjustable embodiment the stabilizing arm includes a drawbar adapted to seat in the trailer hitch receptacle of the pickup truck trailer hitch and mount on a support sleeve slidably receiving a vertically-oriented support, with a clamp threaded into the support sleeve and selectively engaging the support for vertically adjusting the support with respect to the support sleeve. A hitch arm extends from the top end of the support and is fitted with a fixed or selectively pivotable coupler for attaching the hitch arm to the ATV ball mounted on the all-terrain vehicle and in a preferred embodiment, an offset leg stop is provided on the bottom end of the support for selectively removing the support from the support sleeve. Uncoupling of the coupler from the ATV ball and pivoting or rotating of the support with respect to the support sleeve upon loosening of the clamp, also rotates the hitch arm and coupler from the all-terrain vehicle. Lowering of the hitch arm and coupler with the support below the plane of the tailgate of the pickup truck facilitates loading and unloading of the all-terrain vehicle from the pickup truck bed, typically by means of ramps.

SUMMARY OF THE INVENTION

These and other objects of the invention are provided in a new and improved stabilizing arm for engaging a pickup truck and an all-terrain vehicle loaded in the bed of the pickup truck, which stabilizing arm is designed to removably attach to the trailer hitch of the pickup truck and couple to the ATV ball of the all-terrain vehicle when the all-terrain vehicle is loaded in the bed of the pickup truck and secure the all-terrain vehicle, as well as a pair of ATV loading ramps, in the bed of the pickup truck. In a preferred embodiment the stabilizing arm is adjustable and is characterized by a drawbar constructed of square or box tubing for removable mounting in the receptacle opening of the pickup truck trailer hitch; a vertically-oriented box tubing support sleeve welded or otherwise fixed to the drawbar and provided with a clamp or pin and a slidably-disposed box tubing support which can be vertically, but not pivotally, adjustably situated in the support sleeve by operation of the clamp or pin. A typically box tubing hitch arm extends from the upper end of the support and is fitted with a fixed or selectively pivotable trailer hitch ball coupler for attaching to an ATV ball mounted on the all-terrain vehicle. A cylindrical support leg is attached to the bottom end of the box tubing support to facilitate uncoupling the trailer hitch ball coupler from the ATV ball, loosening the clamp or removing the pin in the support sleeve, sliding the support upwardly and aligning the cylindrical support leg with the support sleeve to facilitate rotating the hitch arm and coupler at least 90-degrees and then lowering the support in the support sleeve to position the hitch arm and coupler below the plane of the tailgate for unloading the all-terrain vehicle from the pickup truck bed. A typically box tubing leg stop may be provided on the bottom of the support leg, typically in 45-degree offset relationship with respect to the box tubing support sleeve, for selectively removing the support from the support sleeve.

BRIEF DESCRIPTION OF THE DRAWINGS

The invention will be better understood by reference to the accompanying drawings, wherein:

FIG. 5 is a sectional view of the sleeve and support elements taken along line 5—5 in FIG. 4;

FIG. 6 is a longitudinal sectional view of the sleeve, support leg and support elements of the stabilizing arm illustrated in FIG. 4, with the cylindrical support leg positioned inside the sleeve to allow pivoting or rotation of the support with respect to the sleeve;

FIG. 7 is a sectional view of the sleeve and support leg taken along line 7—7 in FIG. 6;

FIG. 8 is a top view of the stabilizing arm with the support arm in rotated configuration, away from the all-terrain vehicle, as illustrated in FIG. 2;

FIG. 8A is a side view of a pivotally-mounted ball coupler in non-pivoting configuration;

FIG. 8B is a side view of the pivotally-mounted ball coupler illustrated in FIG. 8A, in pivoted configuration;

FIG. 9 is a side view of a non-adjustable design of the stabilizing arm;

FIG. 10 is a side view, partially in section, of an alternative horizontal adjustable embodiment of the support arm element of the stabilizing arm;

FIG. 11 is a side view, partially in section, of an alternative vertical adjustable embodiment of the support and support sleeve elements;

FIG. 12 is a sectional view, taken along line 12—12 of the support sleeve and support illustrated in FIG. 11;

FIG. 13 is a side view of a round tubing or bar stock adjustable embodiment of the stabilizing arm; and FIG. 14 is a sectional view, taken along line 14—14 of the stabilizing arm and sleeve illustrated in FIG. 13.

DESCRIPTION OF THE PREFERRED EMBODIMENTS

Figures 1, 2, 3, 3A, 3B, 4:
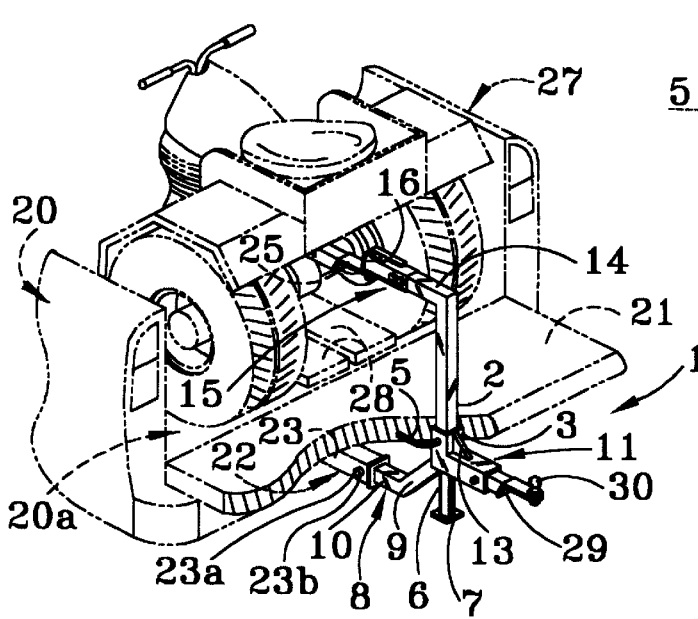
FIG. 1 is a perspective view of a preferred adjustable embodiment of the stabilizing arm in functional position stabilizing an all-terrain vehicle in the bed of a pickup truck.
FIG. 2 is a rear view of the top portion of the stabilizing arm illustrated in FIG. 1, with the support arm pivoted or rotated and lowered to facilitate unloading of the all-terrain vehicle from the pickup truck.
FIG. 3 is a side view of the stabilizing arm illustrated in FIG. 1.
FIG. 3A is a front view, partially in section, of an optional leg stop mounted on the support leg element of the support member for selectively removing the support from the support sleeve.
FIG. 3B is a bottom view of the leg stop illustrated in FIG. 3A, more particularly illustrating a 45-degree offset mounting of the leg stop with respect to the support sleeve.
FIG. 4 is an enlarged, longitudinal sectional view of the sleeve, support leg and support elements of the stabilizing arm illustrated in FIG. 3, with the support disposed in non-pivoting relationship inside the sleeve.

Referring initially to FIGS. 1–8 of the drawings, in a first preferred embodiment and adjustable stabilizing arm of this invention is generally illustrated by reference numeral 1. The adjustable stabilizing arm 1 is characterized by a support 2, typically constructed of square box tubing, that slidably mounts in a box tubing support sleeve 3, fitted with a lock nut 4 for threadably receiving a support clamp 5. The end of the support clamp 5, provided with clamp threads 5A, is threaded in the lock nut 4 and extends into selective contact with the support 2 to facilitate vertical adjustment of the support 2 in the support sleeve 3. Since in this embodiment of the invention the support 2 and the support sleeve 3 are both constructed of box tubing, the support 2 is prevented from pivoting or rotating in the support sleeve 3 (FIGS. 1 and 4), but is constrained to vertical adjustment in the support sleeve 3 by loosening of the support clamp 5, as hereinafter further described. A drawbar 8, also typically constructed of box tubing, has a sleeve segment 9 welded or otherwise fixed to the support sleeve 3 and the opposite connecting segment 10 of the drawbar 8 is provided with a pair of drawbar openings 8a, (FIG. 3) to facilitate projection of the connecting segment 10 end of the drawbar 8 into the conventional hitch receptacle 23 of a truck trailer hitch 22, mounted on a pickup truck 20 having a tailgate 21. Accordingly, a receptacle pin 23a can be extended through the pin opening 23b in the hitch receptacle 23 of the truck trailer hitch 22 and through a corresponding one of the drawbar openings 8a in the drawbar 8, to removably secure the stabilizing arm 1 on the pickup truck 20. A drawbar padlock 24 may be extended through an opening provided in the receptacle pin 23a to prevent unauthorized removal of the drawbar 8 and thus, the stabilizing arm 1, from the truck trailer hitch 22 of the pickup truck 20.

Referring to FIGS. 1, 3, 3A, 3B, 4 and 6 of the drawings, a cylindrical support leg 6 is welded or otherwise attached to the bottom end of the box tubing support 2 and may be fitted with a leg plate 7, for contacting the ground or supporting surface when the support 2 is adjusted to the full downwardly-extending configuration, as hereinafter further described. Alternatively, a box tubing leg stop 33 may be welded to the bottom end of the support leg 6 in typically 45-degree offset relationship with respect to the box tubing support sleeve 3 and equal in size to the box tubing support 2, as illustrated in FIGS. 3A and 3B. This design facilitates removal of the support 2 from the support sleeve 3 when the support 2 is adjusted to align the support leg 6 inside the support sleeve 2 (FIGS. 6 and 7) and allow rotation of the support 2 inside the support sleeve 2, as hereinafter further described. Furthermore, one end of a support arm 14 is welded or otherwise fixed to the upper end of the support 2 and the opposite end of the support arm 14 is fitted with a ball coupler 15, having a ball receptacle 17 and a conventional coupler lever 16, for securing the ball coupler 15 on the all-terrain vehicle (ATV) ball 26 of an all-terrain vehicle 27, which ATV ball 26 is typically mounted on a ball mount plate 25, as illustrated in FIG. 3. A pair of coupler mount bolts 18 typically serve to mount the ball coupler 15 on the support arm 14 in a fixed embodiment and a coupler padlock 19 (FIG. 3) can be used to secure the ball coupler 15 in locked configuration on the ATV ball 26. As further illustrated in FIGS. 1–8, in a most preferred embodiment of the adjustable stabilizing arm 1 of this invention, a drawbar extension 11 extends from the support sleeve 3, for purposes which will be hereinafter described.

As illustrated in FIGS. 8A and 8B of the drawings, the ball coupler 15 may alternatively be pivotally attached to the extending end of the support arm 14 by means of a pivot pin 36 and secured by a lock pin 35, extending through a lock pin opening 35A (FIG. 8B) and an aligned opening (not illustrated) in the support arm 14. This pivoting function facilitates easy coupling and uncoupling of the ball coupler 15 on and from, respectively, the ATV ball 26, illustrated in FIG. 3.

Referring now to FIG. 9 of the drawings, in a second preferred embodiment of the invention the non-adjustable stabilizing arm 1a is fixed, with the drawbar 8, support 2 and support arm 14 rigidly constructed. Accordingly, the extending end of the drawbar 8 can be inserted in the hitch receptacle 23 of the truck trailer hitch 22 as described above and the ball coupler 15 coupled to the ATV ball 26 as further described above, to rigidly secure the all-terrain vehicle 27 in the truck bed 20a of a pickup truck 20, illustrated in FIG. 1. Alternatively, the pivoting ball coupler 15 illustrated in FIGS. 8A and 8B can be pivotally attached to the support arm 14, to aid in coupling and uncoupling of the ball coupler 15 to and from the ATV ball 26, respectively.

FIG. 10 illustrates an alternative design for the support arm 14, wherein a support arm adjusting bar 14a telescopes in the support arm 14 and adjustably mounts the ball coupler 15 by means of a pin (not illustrated), extending through selected ones of the bar openings 14b and a registering opening (not illustrated) provided in the support arm 14.

FIGS. 11 and 12 illustrate a similar adjustment of the support 2 without the necessity of using a support clamp 5; an adjusting pin 34 selectively engages one of the support openings 2a and a corresponding opening (not illustrated) in the sleeve 3 to fix the support 2 in the sleeve 3.

Referring now to FIGS. 13 and 14, the support 2, support sleeve 3 and the elements of the adjustable stabilizing arm 1 of the adjustable stabilizing arm 1 of this invention can be constructed of round tubing or bar stock, to facilitate rotation or pivoting of the support 2 in the support sleeve 3 without raising the support 2 to align the cylindrical support leg 6 inside the support sleeve 3, as is necessary in the adjustable stabilizing arm 1 illustrated in FIGS. 1–8. However, in this embodiment, the support clamp 5 must prevent undesirable rotation of the support 2 in the support sleeve 3. As in the case of the embodiments of the invention illustrated in FIGS. 1–8 and FIG. 9, respectively, the pivoting ball coupler 15 can be pivotally attached to the support arm 14, to aid in coupling and uncoupling the ball coupler 15 to and from the ATV ball 26.

Referring again to FIGS. 1–8 of the drawings, in operation, it will be appreciated that the adjustable stabilizing arm 1 is designed to selectively maintain the all-terrain vehicle 27 in a stabilized and secure configuration in the truck bed 20a of the pickup truck bed 20. In order to accomplish this task, the adjustable stabilizing arm 1 is configured such that the connecting segment 10 of the drawbar 8 is fitted into the hitch receptacle 23 of the truck trailer hitch 22 and is secured in place with a receptacle pin 23a and optionally, a drawbar padlock 24 (FIG. 3). The support clamp 5, threadably extending through the support sleeve 3 of the stabilizing arm 1, is then loosened to facilitate vertical adjustment of the support 2, positioning of the cylindrical support leg 6 inside the box tubing support sleeve 3 and rotation of the support arm 14 and ball coupler 15 toward the all-terrain vehicle 27 (FIGS. 6–8). When the ball coupler 15 is positioned above the all-terrain vehicle ball 26 of the all-terrain vehicle 27, the support 2 is adjusted downwardly in the support sleeve 3 to align the box tubing support 2 with the support sleeve 3 and engage the ball receptacle 17 of the ball coupler 15 with the ATV ball 26. The coupler lever 16 is then manipulated downwardly to seat the ATV ball 26 in the ball receptacle 17 and lock the ball coupler 15 and the support arm 14 on the ATV ball 26 (FIGS. 1 and 3). When this step is accomplished, the support clamp 5 is then tightened to secure the box tubing support 2 from sliding inside the box tubing support sleeve 3. A coupler padlock 19 may be inserted in the ball coupler 15 as illustrated in FIG. 3, to secure the ball coupler 15 on the all-terrain vehicle ball 26. When the stabilizing arm 1 is in the configuration illustrated in FIG. 1 and is installed as described above, the all-terrain vehicle 27 is secured from forward or side-to-side movement in the truck bed 20a. Furthermore, a pair of ramps 28, illustrated in FIGS. 1 and 2, used to load and unload the all-terrain vehicle 27, may be positioned in the truck bed 20a between the wheels of the all-terrain vehicle 27 before the stabilizing arm 1 is manipulated into the locked configuration illustrated in FIG. 1, to prevent theft of the ramps 28, since there is insufficient room between the stabilizing arm 1 and the all-terrain vehicle 27 to remove the ramps 28 from this position of storage.

Under circumstances where it is desired to unload the all-terrain vehicle 27 from the truck bed 20a of the pickup truck 20, the coupler padlock 19 is unlocked and removed from the ball coupler 15 and the coupler lever 16 is manipulated to the upward position, thus unlocking the ball coupler 15 from the ATV ball 26. The support clamp 5 is the n loosened to facilitate vertical sliding adjustment of the support 2 inside the support sleeve 3 and the ball coupler 15 and support arm 14 are lifted, along with the support 2, to the point where the ball receptacle 17 of the ball coupler 15 is removed from the ATV ball 26 and the cylindrical support leg 6 enters and corresponds with the support sleeve 3 (FIGS. 6 and 7). The support arm 14 is then pivoted or rotated as illustrated in FIG. 8 to a position approximately 90-degrees disposed with respect to the functional, locked configuration described above and illustrated in FIG. 1, and the support arm 14 is adjusted downwardly along with the support 2, to a position below the plane of the tailgate 21, as illustrated in FIG. 2. This action allows removal of the ramps 28 from the stored position between the wheels of the all-terrain vehicle 27 and positioning of the ramps 28, with one end on the tailgate 21 and the opposite end on the ground or supporting surface in conventional fashion (not illustrated), to allow unloading of the all-terrain vehicle 27 from the truck bed 20a of the pickup truck 20. Re-loading of the all-terrain vehicle 27 into the truck bed 20a is accomplished by reversing this procedure and subsequently again storing the ramps 28 in the truck bed 20a between the wheels of the all-terrain vehicle 27, raising the support 2, the support arm 14 and ball coupler 15 of the stabilizing arm 1 to align the cylindrical support leg 6 with the support sleeve 3 and again pivoting the support arm 14 into position such that the ball coupler 15 is oriented above the ATV ball 26 of the all-terrain vehicle 27. Re-coupling of the ball coupler 15 to the all-terrain vehicle ball 26 is accomplished in the manner described above. Under circumstances where the coupler 15 is pivotally attached to the support arm 14 as illustrated in FIGS. 8A and 8B, the lock pin 35 can be removed from the lock pin opening 35a in the ball coupler 15 and the ball coupler 15 pivoted upwardly on the support arm 14, as illustrated in FIG. 8B, and selectively locked onto and released from the ATV ball 26 by insertion and removal of the lock pin 35, respectively.

Referring now to FIGS. 1, 3, 6 and 8 of the drawings, in another preferred embodiment of the invention the drawbar extension 11, having an extension opening 12 (FIG. 2) is fitted with a conventional removable ball mount 29, to which is attached a trailer ball 30, by means of a ball nut 26a. A gusset 13 is typically welded between the drawbar extension 11 and the support sleeve 3 and serves to strengthen the drawbar 11, as deemed necessary. A mount pin 31 is typically extended through aligned openings provided in the ball mount 29 and the drawbar extension 11 and a ball mount padlock 32 (FIG. 3) may be used to removably secure the ball mount 29 on the drawbar extension 11. Accordingly, while the stabilizing arm 1 is in the functional configuration described above for stabilizing and securing the all-terrain vehicle 27 in the truck bed 20a of the pickup truck 20, a trailer (not illustrated) such as a boat trailer, utility trailer or the like, may be coupled to the trailer ball 30 and towed by the pickup truck 20, as desired. The mount pin 31 can be removed from the drawbar extension 11 and the ball mount 29 to remove the ball mount 29 and trailer ball 30 from the drawbar extension 11 for storage purposes, as desired.

It will be appreciated by those skilled in the art that in a most preferred embodiment of the invention the support 2, support sleeve 3 and support arm 14, as well as the drawbar 8 embodied in FIGS. 1–8 are constructed of square box tubing of sufficient wall thickness to facilitate stabilizing and securing the all-terrain vehicle 27 in the truck bed 20a of the pickup truck bed 20 and towing of a trailer by operation of the drawbar extension 11. The use of square box tubing in this capacity is preferred in the adjustable design of the stabilizing arm 1, since the support 2 is allowed to slidably adjust with respect to the support sleeve 3, but cannot pivot within the support sleeve 3 when the stabilizing arm 1 is in the locked, functional configuration described above and illustrated in FIGS. 1, 4 and 5, to secure and maintain the all-terrain vehicle 27 in the truck bed 20a of the pickup truck 20. As described above, the pivoting or rotating function of the support 2 is facilitated by upward adjustment of the support 2 in the support sleeve 3 to the point where the cylindrical tubing or bar stock support leg 6 corresponds to the support sleeve 3, wherein pivoting or rotation of the support arm 14 is thereby allowed (FIGS. 6 and 7). It will be appreciated by those skilled in the art that other materials of construction, such as round tubing or bar stock (FIGS. 13 and 14), as well as channel-shaped members, angle iron and like structural members (not illustrated) can be used to construct the stabilizing arm 1. However, the facility for preventing undesirable pivoting of the support 2 and thus, the support arm 14 and ball coupler 15 in the support sleeve 3, is most preferably provided in order to stabilize the all-terrain vehicle 27 in the truck bed 20a of the pickup truck 20. It will also be appreciated by those skilled in the art that the wall thickness of the support 2, support sleeve 3, drawbar 18, drawbar extension 11 and the support arm 14 are a matter of choice, depending upon the relative load applied to the respective structural members in use. Moreover, under circumstances where the support leg 6 is fitted with a leg stop 33, illustrated in FIGS. 3A and 3B, the support 2 can be quickly and easily removed from the support sleeve 3 as follows: the support 2 can be first lifted in the support sleeve 3 to align the support leg 6 inside the support sleeve 3, as illustrated in FIGS. 6 and 7. The support 2 is then rotated 45-degrees with respect to the support sleeve 3 to align the offset leg stop 3 with the opening in the support sleeve 3 and may then be slipped from the support sleeve 3. Replacement of the support 2 in the support sleeve 3 can be effected by reversing this procedure.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A stabilizing arm for securing an all-terrain vehicle in the bed of a truck, said stabilizing arm comprising a drawbar for mounting on the truck; a support provided on said drawbar and a sleeve provided on said drawbar for slidably receiving said support, wherein said sleeve and said support are constructed of square box tubing; a support adjuster provided on said sleeve for selectively engaging said support, whereby said support is slidably and adjustable carried by said sleeve; an ATV coupler carried by said support, whereby the all-terrain vehicle is secured in the bed of the truck responsive to attachment of said drawbar to the truck and attachment of said ATV coupler to the all-terrain vehicle; and a cylindrical support leg provided on said support, whereby said support is rotatably disposed in said sleeve responsive to slidable location of said cylindrical support leg in said sleeve for rotating said ATV coupler away from the all-terrain vehicle.

2. The stabilizing arm of claim 1 comprising a drawbar extension provided on said drawbar for towing a trailer behind the truck.

3. The stabilizing arm of claim 1 wherein the all-terrain vehicle is equipped with an ATV ball and said ATV coupler comprises a support arm extending from said support and a ball coupler provided on said support arm for removably engaging the ATV ball.

4. The stabilizing arm of claim 3 comprising a drawbar extension provided on said drawbar for towing a trailer behind the truck.

5. The stabilizing arm of claim 3 comprising a pin engaging said ball coupler and said support arm for pivotally connecting said ball coupler to said support arm and selectively allowing said ball coupler to pivot with respect to said support arm.

6. The stabilizing arm of claim 5 comprising a drawbar extension provided on said drawbar for towing a trailer behind the truck.

7. A stabilizing arm for mounting on a pickup truck and removably coupling to an all-terrain vehicle located in the bed of the pickup truck, said stabilizing arm comprising a drawbar for mounting on the pickup truck; a sleeve carried by said drawbar; a support slidably disposed in said sleeve, wherein said sleeve and said support are constructed of square box tubing; a support adjuster carried by said sleeve for selectively engaging said support and adjusting said support in said sleeve; a support arm extending from said support; an ATV coupler provided on said support arm for engaging the all-terrain vehicle, whereby the all-terrain vehicle is secured in the bed of the pickup truck responsive to attachment of said drawbar to the pickup truck, manipulating said support adjuster to adjust said support in said sleeve and engagement of the all-terrain vehicle with said ATV coupler; and a cylindrical support leg provided on said support, whereby said support is rotatably disposed in said sleeve responsive to slidable location of said cylindrical support leg in said sleeve for rotating said ATV coupler away from the all-terrain vehicle.

8. The stabilizing arm of claim 7 comprising a drawbar extension provided on said drawbar for towing a trailer behind the pickup truck.

9. The stabilizing arm of claim 7 wherein the all-terrain vehicle is equipped with an ATV ball and said ATV coupler comprises a ball coupler provided on said support arm for removably engaging the ATV ball.

10. The stabilizing arm of claim 9 comprising a drawbar extension provided on said drawbar for towing a trailer behind the pickup truck.

11. The stabilizing arm of claim 7 comprising a leg stop provided on said support leg, said leg stop constructed of square box tubing and oriented on said support leg in 45-degree offset relationship with respect to said sleeve for projecting through said sleeve responsive to rotation of said support at said support leg and alignment of said leg stop inside said sleeve.

12. The stabilizing arm of claim 11 comprising a drawbar extension provided on said drawbar for towing a trailer behind the pickup truck.

13. The stabilizing arm of claim 11 wherein the all-terrain vehicle is equipped with an ATV ball and said ATV coupler comprises a ball coupler provided on said support arm for removably engaging the ATV ball.

14. The stabilizing arm of claim 13 comprising a drawbar extension provided on said drawbar for towing a trailer behind the pickup truck.

15. The stabilizing arm of claim 9 comprising a pin engaging said ball coupler and said support arm for pivotally connecting said ball coupler to said support arm and selectively allowing said ball coupler to pivot with respect to said support arm.

16. The stabilizing arm of claim 15 comprising a drawbar extension provided on said drawbar for towing a trailer behind the truck.

17. The stabilizing arm of claim 15 comprising a leg stop provided on said support leg, said leg stop constructed of square box tubing and oriented on said support leg in 45-degree offset relationship with respect to said sleeve for projecting through said sleeve responsive to rotation of said support at said support leg and alignment of said leg stop inside said sleeve.

18. A stabilizing arm for removably mounting on the trailer hitch of a pickup truck and coupling to an all-terrain vehicle having an ATV ball and located in the bed of the pickup truck, said stabilizing arm comprising a drawbar for removably mounting in the trailer hitch of the pickup truck; a square box tubing sleeve carried by said drawbar; a square box tubing support slidably disposed in said sleeve; a clamp threadably seated in said sleeve and selectively engaging said support for adjustably securing said support in said sleeve; a support arm extending from said support and a ball coupler provided on said support arm for removably coupling said support arm to the ATV ball; a cylindrical support leg extending from the bottom of said support for rotating said support, said support arm and said ball coupler with respect to said sleeve when said support is slidably adjusted to align said support leg in said sleeve responsive to manipulation of said clamp; and a leg stop oriented on said support leg in offset relationship with respect to said sleeve for projecting through said sleeve responsive to rotation of said support at said support leg and alignment of said leg stop inside said sleeve.

19. The stabilizing arm of claim 18 comprising a drawbar extension provided on said drawbar for towing a trailer behind the truck.

20. The stabilizing arm of claim 19 comprising a pin engaging said ball coupler and said support arm for pivotally connecting said ball coupler to said support arm and selectively allowing said ball coupler to pivot with respect to said support arm.

* * * * *